US008208894B2

(12) United States Patent
Lai

(10) Patent No.: US 8,208,894 B2
(45) Date of Patent: Jun. 26, 2012

(54) COMMUNICATION DEVICE AND METHOD FOR MANAGING COMMUNICATON DATA

(75) Inventor: Hou-Wen Lai, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

(*) Notice: Subject to any disclaimer, the term of this patent is extended or adjusted under 35 U.S.C. 154(b) by 240 days.

(21) Appl. No.: 12/581,234

(22) Filed: Oct. 19, 2009

(65) Prior Publication Data

US 2010/0178908 A1 Jul. 15, 2010

(30) Foreign Application Priority Data

Jan. 15, 2009 (CN) .......................... 2009 1 0300197

(51) Int. Cl.
*H04M 11/00* (2006.01)
(52) U.S. Cl. ........ 455/405; 455/406; 455/407; 455/409; 379/13; 379/114.01; 379/121.04
(58) Field of Classification Search .......... 455/405–408, 455/415, 418; 379/13, 114.01, 121.04
See application file for complete search history.

(56) References Cited

U.S. PATENT DOCUMENTS

| | | | |
|---|---|---|---|
| 6,026,292 A * | 2/2000 | Coppinger et al. | 455/406 |
| 6,321,078 B1 * | 11/2001 | Menelli et al. | 455/407 |
| 7,551,899 B1 * | 6/2009 | Nicolas et al. | 455/73 |
| 2002/0029189 A1 * | 3/2002 | Titus et al. | 705/39 |
| 2005/0130631 A1 * | 6/2005 | Maguire et al. | 455/414.1 |
| 2006/0056606 A1 * | 3/2006 | Bocking et al. | 379/112.01 |
| 2008/0263457 A1 * | 10/2008 | Kim et al. | 715/753 |
| 2009/0176484 A1 * | 7/2009 | Lee | 455/415 |
| 2009/0291665 A1 * | 11/2009 | Gaskarth et al. | 455/405 |

* cited by examiner

*Primary Examiner* — Marivelisse Santiago Cordero
*Assistant Examiner* — Dung Hong
(74) *Attorney, Agent, or Firm* — Altis Law Group, Inc.

(57) ABSTRACT

A communication device and method for managing communication data include acquiring communication data of the communication device, searching the storage system for communication data of a selected contact according to an inputted name of the selected contact. The communication device and method further include generating a communication report of the selected contact according to the searched communication data of the selected contact, displaying the communication report on a display of the communication device.

6 Claims, 3 Drawing Sheets

COMMUNICATION DEVICE AND METHOD FOR MANAGING COMMUNICATON DATA

BACKGROUND

1. Technical Field

Embodiments of the present disclosure relate to managing data, and more particularly to a communication device and method for managing communication data.

2. Description of Related Art

Generally, a communication device has multiple functions, such as the function to make or answer a phone call, and send a message, for example. Various kinds of communication data is stored in the communication device, such as a call time length of a phone call, messages, for example. However, it is difficult for people to manage specified communication data of a selected contact.

What is needed, therefore, is a communication device and a method for managing communication data.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
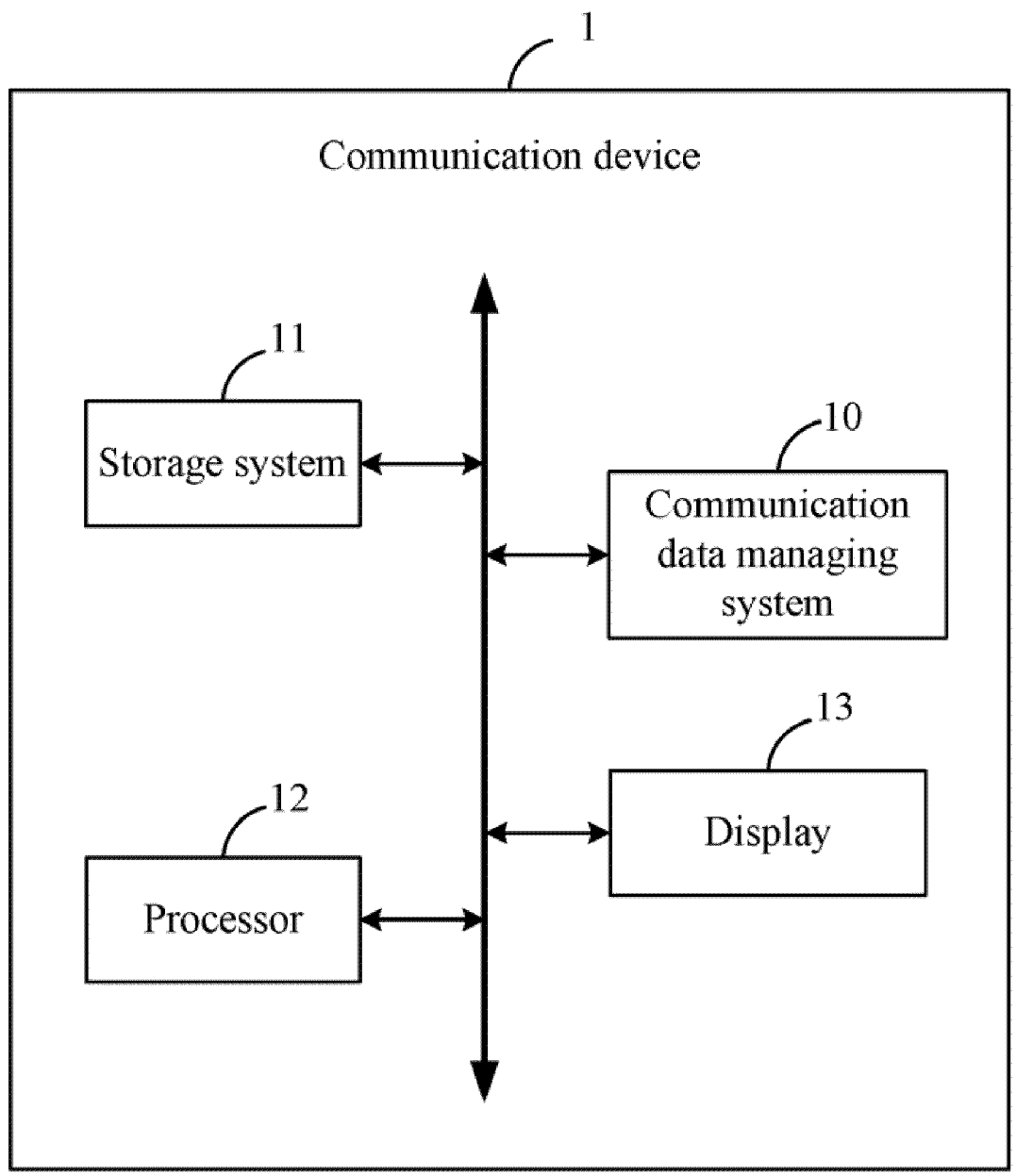
FIG. 1 is a block diagram of one embodiment of a communication device including a communication data managing system.

FIG. 1 is a block diagram of one embodiment of a communication device 1 including a communication data managing system 10. The communication data managing system 10 may be used to acquire communication data while the communication device 1 is performing a communication, and generate a communication report of a select contact for people to view the communication data of the select contact. By utilizing the communication data managing system 10, people may conveniently view communication report of a selected contact.

The communication device 1 may be a mobile phone, a personal digital assistant (PDA), a handheld computer, or any other kind of computing device. In the embodiment as shown in FIG. 1, the communication device 1 may further include a storage system 11, a processor 12, and a display 13. The storage system 11 stores one or more programs, such as programs of an operating system, other applications of the communication device 1, and various kinds of data, such as a name of each contact, phone number(s) of each contact, communication data, for example. In one embodiment, the storage system 11 may be a memory of the communication device 1 or an external storage card, such as a memory stick, a subscriber identification module (SIM) card, a smart media card, a compact flash card, or any other type of memory card. The processor 12 executes one or more computerized operations of the communication device 1 and other applications, to provide functions of the communication device 1. The display 13 may display or output visible data, such as the communication report, for example.

Figure 2:
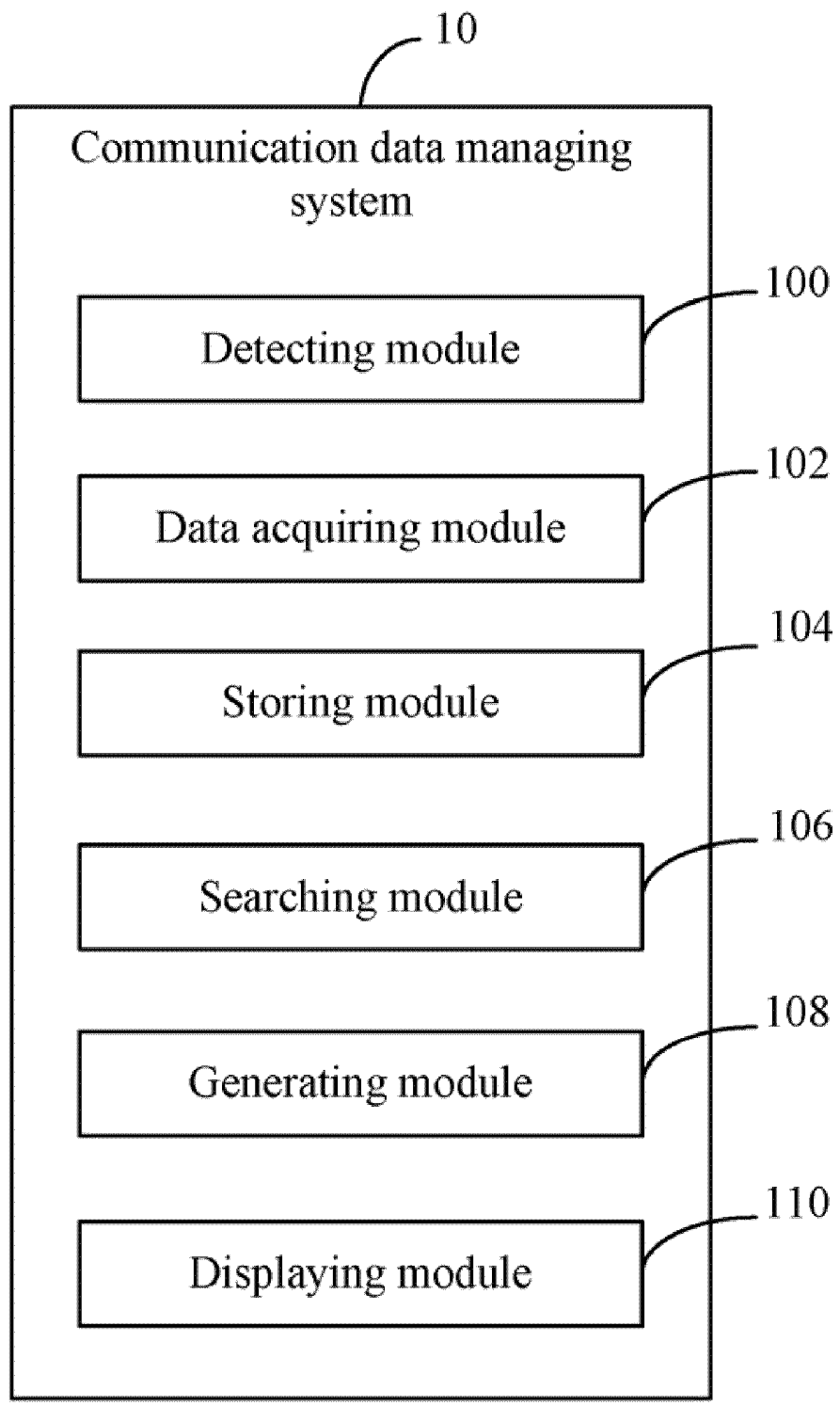
FIG. 2 is a block diagram of one embodiment of the communication data managing system in FIG. 1.

FIG. 2 is a block diagram of one embodiment of the communication device 1 including the communication data managing system 10. In one embodiment, the communication data managing system 10 includes a detecting module 100, a data gathering module 102, a storing module 104, a searching module 106, a generating module 108, and a displaying module 110. The modules 100, 102, 104, 106, 108, and 110 may comprise one or more computerized operations to be executed by the processor 12 to perform one or more operations of the communication device 1.

The detecting module 100 detects if the communication device 1 has performed a communication with a contact. In one embodiment, the communication may be a phone call or a message. The message may be an instant messaging service, a short messaging service, and a multimedia messaging service, for example.

The data acquiring module 102 acquires communication data of the contact. In one embodiment, the communication data may include phone call information and message information. The phone call information includes a phone number, a contact name, a timestamp of the phone call, a call time length of the phone call (e.g., 10 minutes), and a call value of the phone call. In one embodiment, the call value is calculated according to a formula of "call value=call length*predetermined call coefficient." The predetermined call coefficient may be predefined by a user. For example, if the predetermined call coefficient is predefined as 5 per minute, then, if the call time length is 0.5 minutes, the call value=0.5*5=2.5, if the call time length is 6.5 minutes, the call value=6.5*5=32.5. The message information includes a timestamp of a message (e.g., ten-thirty on Jan. 1, 2009), message length measured in number of characters of the message (e.g., ten characters), and message value of the message. In one embodiment, the message value is calculated according to a formula of "message value=message length measured in number of characters*predetermined message coefficient." The predetermined message coefficient may be predefined by a user, for example, if the predetermined message coefficient is predefined as 1 per character, then, if the message length measured in number of characters of the message is 10, the message value=10*1=10, if the message length measured in number of characters of the message is 35, the message value=35*1=35.

The storing module 104 stores the communication data in the storage system 11.

The searching module 108 searches the storage system 11 for communication data of a selected contact according to an inputted name of the selected contact.

The generating module 110 generates a communication report of the selected contact according to the searched communication data of the selected contact. In one embodiment, the communication report of the selected contact includes the timestamp of each phone call with the selected contact, the call time length of each phone call with the selected contact, a total call value, the timestamp of each message with the selected contact, message length measured in number of characters of each message with the selected contact, and a total message value. The total call value is calculated by adding all the call values of the phone call with the contact. The total message value is calculated by adding all the message values of the message sent to the contact or received from the contact.

The displaying module 112 displays the communication report on the display 13 of the communication device 1 for the user to view.

Figure 3:
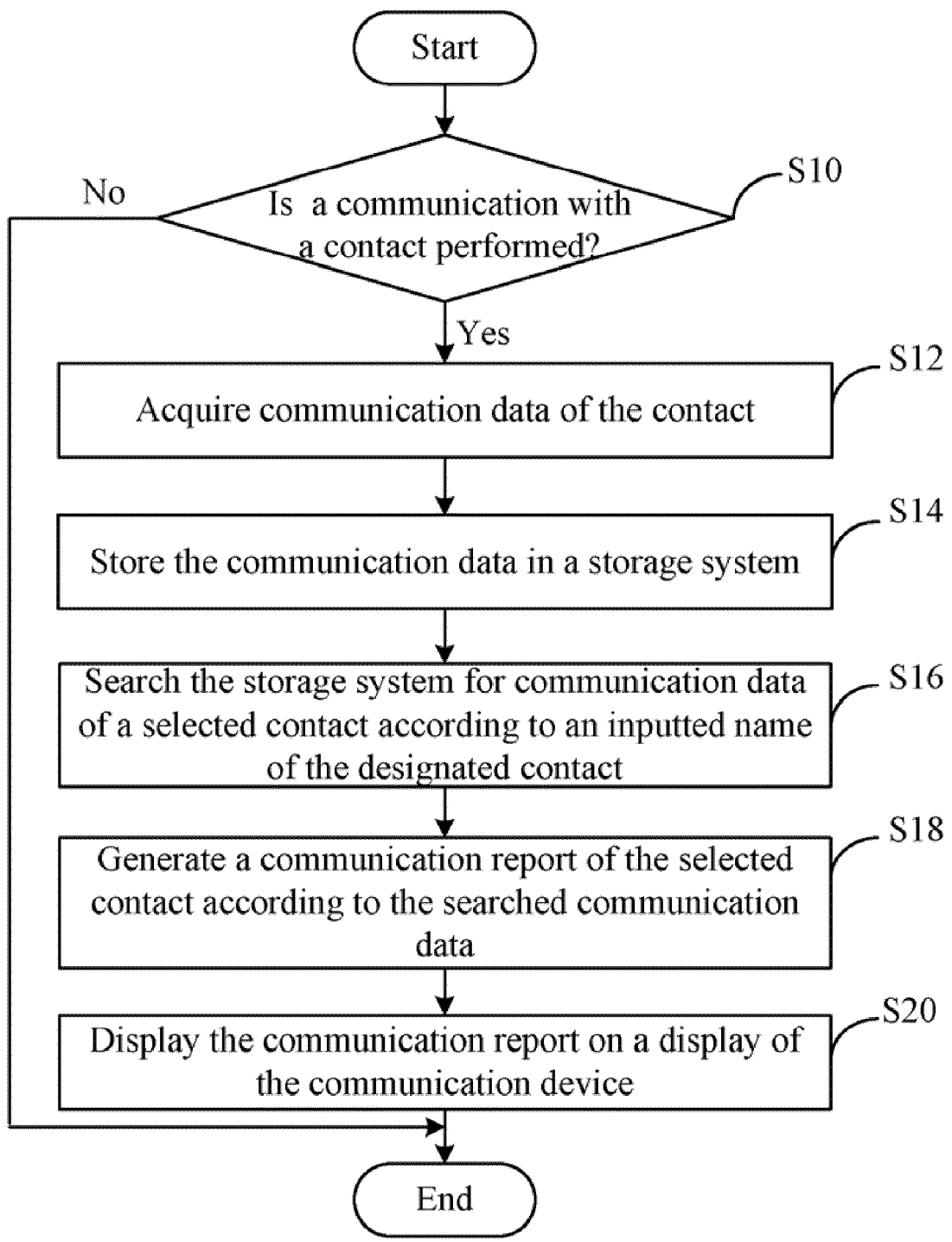
FIG. 3 is a flowchart of one embodiment of a method for managing communication data of the communication device of FIG. 1.

FIG. 3 is a flowchart of one embodiment of a method for managing communication data of a communication device 1. Depending on the embodiment, additional blocks may be added, others removed, and the ordering of the blocks may be replaced.

In block S10, the detecting module 100 detects if the communication device 1 has performed a communication with a contact. The communication may be a phone call or a message. The message may be an instant messaging service, a short messaging service, and a multimedia messaging service, for example.

In block S12, the data acquiring module 102 acquires communication data of the contact. In one embodiment, the communication data may include phone call information and message information. The phone call information includes a phone number, a contact name, a timestamp of the phone call, a call time length of the phone call, and call value of the phone call. The message information includes a timestamp of a message, message length measured in number of characters of the message, and message value of the message.

In block S14, the storing module 104 stores the communication data in the storage system 11.

In block S16, the searching module 108 searches the storage system 11 for communication data of a selected contact according to an inputted name of the selected contact.

In block S18, the generating module 110 generates a communication report of the selected contact according to the searched communication data of the selected contact. The communication report of the selected contact includes the timestamp of each phone call with the selected contact, the call time length of each phone call with the selected contact, a total call value, the timestamp of each message with the selected contact, message length measured in number of characters of each message with the selected contact, and a total message value. The total call value is calculated by adding all the call values of the phone call with the contact. The total message value is calculated by adding all the message values of the message sent to the contact or received from the contact.

In block S20, the displaying module 112 displays the communication report on the display 13 of the communication device 1 for the user to view.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device capable of managing communication data, the communication device comprising:
    a storage system;
    at least one processor; and
    one or more programs stored in the storage system and being executable by the at least one processor, the one or more programs comprising:
        a data acquiring module operable to acquire communication data of the communication device, wherein the communication data comprises phone call information and message information, the phone call information comprising a phone number, a contact name, a timestamp of the phone call, a call time length of the phone call and a call value, the message information comprising a timestamp of the message, a message length measured in number of characters of the message and a message value, the call value being calculated according to a formula of "call value=call time length*predetermined call coefficient," the message value being calculated according to a formula of "message value=message length measured in number of characters* predetermined message coefficient";
        a storing module operable to store the communication data in the storage system of the communication device;
        a searching module operable to search the storage system for communication data of a selected contact according to an inputted name of the selected contact;
        a generating module operable to generate a communication report of the selected contact according to the searched communication data of the selected contact, wherein the communication report of the selected contact comprises the timestamp of each phone call with the selected contact, the call time length of each phone call with the selected contact, a total call value, the timestamp of each message sent to the selected contact or received from the selected contact, message length measure in characters of each message sent to the selected contact or received from the selected contact, and a total message value; and
        a displaying module operable to display the communication report on a display of the communication device.

2. The communication device according to claim 1, wherein the total call value is calculated by adding all the call values of the phone call with the contact, the total message value is calculated by adding all the message values of the message sent to the contact or received from the contact.

3. A communication data managing method for a communication device, the method comprising:
    acquiring communication data of the communication device, wherein the communication data comprises phone call information and message information, the phone call information comprising a phone number, a contact name, a timestamp of the phone call, a call time length of the phone call and a call value, the message information comprising a timestamp of the message, a message length measured in number of characters of the message and a message value, the call value being calculated according to a formula of "call value=call time length*predetermined call coefficient," the message value being calculated according to a formula of "message value=message length measured in number of characters*predetermined message coefficient";
    storing the communication data in a storage system of the communication device;
    searching the storage system for communication data of a selected contact according to an inputted name of the selected contact;
    generating a communication report of the selected contact according to the searched communication data of the selected contact, wherein the communication report of the selected contact comprises the timestamp of each phone call with the selected contact, the call time length of each phone call with the selected contact, a total call value, the timestamp of each message sent to the selected contact or received from the selected contact, message length measure in characters of each message sent to the selected contact or received from the selected contact, and a total message value; and displaying the communication report on a display of the communication device.

4. The method according to claim 3, wherein the total call value is calculated by adding all the call values of the phone call with the contact, the total message value is calculated by adding all the message values of the message sent to the contact or received from the contact.

5. A non-transitory computer readable medium having stored thereon instructions that, when executed by a processor, causing the processor to perform a communication data managing method for a communication device, the method comprising:

acquiring communication data of the communication device, wherein the communication data comprises phone call information and message information, the phone call information comprising a phone number, a contact name, a timestamp of the phone call, a call time length of the phone call and a call value, the message information comprising a timestamp of the message, a message length measured in number of characters of the message and a message value, the call value being calculated according to a formula of "call value=call time length*predetermined call coefficient," the message value being calculated according to a formula of "message value=message length measured in number of characters*predetermined message coefficient";

storing the communication data in a storage system of the communication device;

searching the storage system for communication data of a selected contact according to an inputted name of the selected contact;

generating a communication report of the selected contact according to the searched communication data of the selected contact, wherein the communication report of the selected contact comprises the timestamp of each phone call with the selected contact, the call time length of each phone call with the selected contact, a total call value, the timestamp of each message sent to the selected contact or received from the selected contact, message length measure in characters of each message sent to the selected contact or received from the selected contact, and a total message value; and displaying the communication report on a display of the communication device.

6. The non-transitory medium according to claim 5, wherein the total call value is calculated by adding all the call values of the phone call with the contact, the total message value is calculated by adding all the message values of the message sent to the contact or received from the contact.

* * * * *